Feb. 7, 1956   F. J. KOZACKA   2,734,111
LOW-VOLTAGE HIGH-CAPACITY CURRENT-LIMITING FUSES
Filed Oct. 21, 1953   5 Sheets-Sheet 1
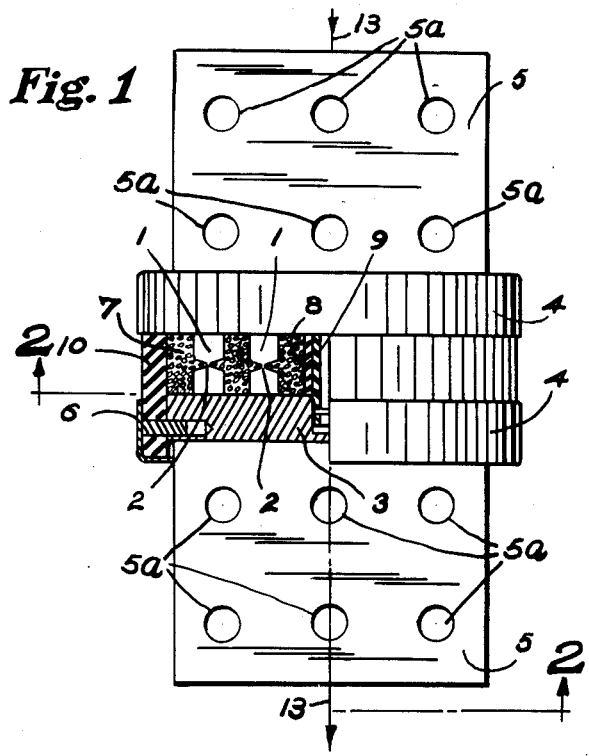
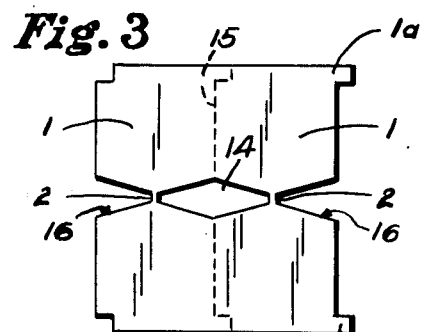
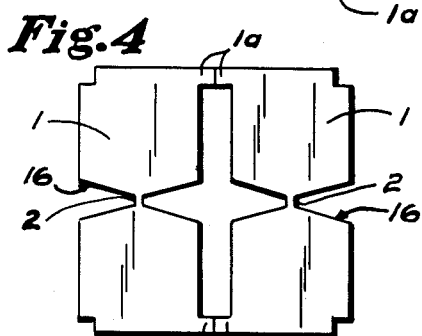
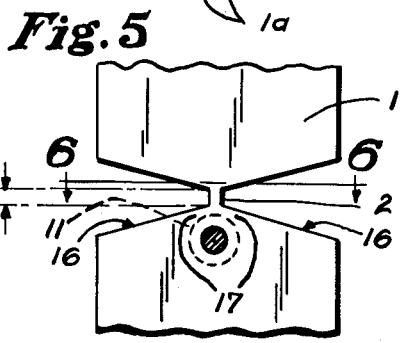
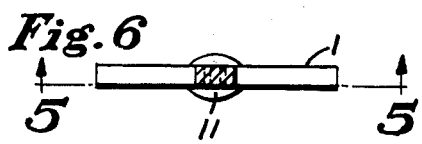
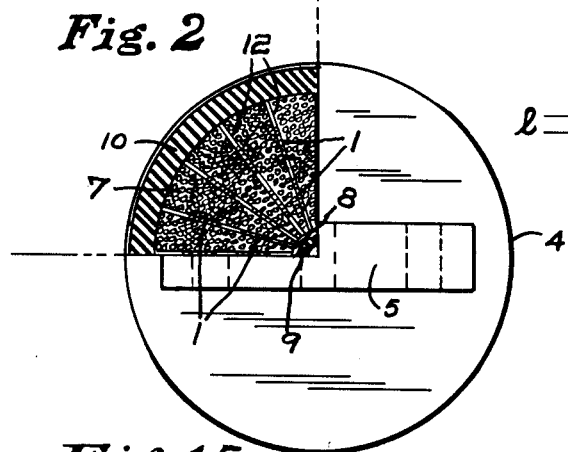
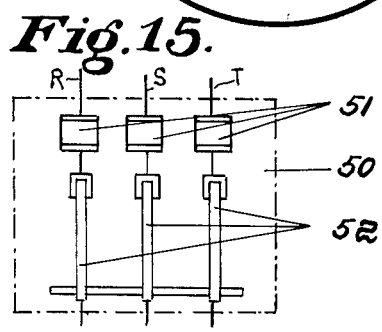
INVENTOR.
Frederick J. Kozacka
BY Feb. 7, 1956  F. J. KOZACKA  2,734,111
LOW-VOLTAGE HIGH-CAPACITY CURRENT-LIMITING FUSES
Filed Oct. 21, 1953  5 Sheets-Sheet 3
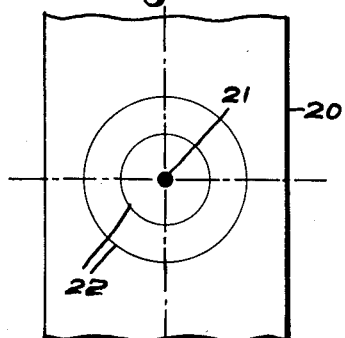
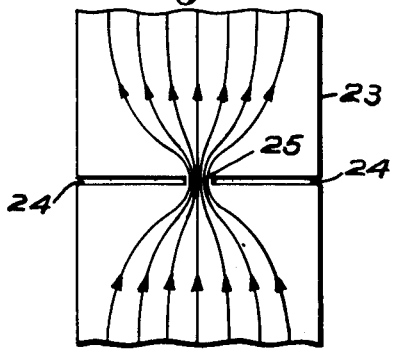
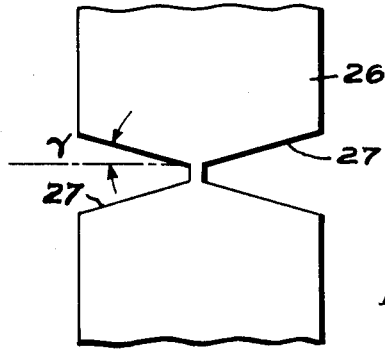
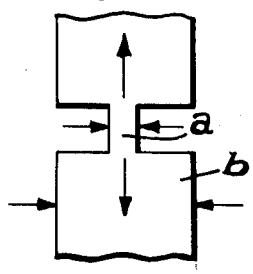
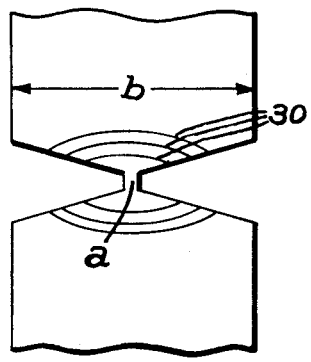
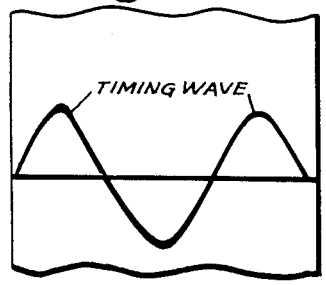
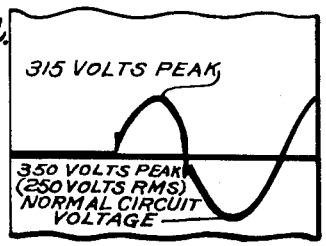
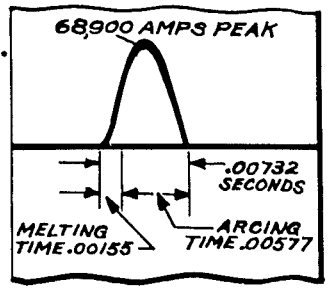
INVENTOR.
Frederick J. Kozacka
BY United States Patent Office 2,734,111
Patented Feb. 7, 1956

2,734,111

LOW-VOLTAGE HIGH-CAPACITY CURRENT-LIMITING FUSES

Frederick J. Kozacka, Amesbury, Mass., assignor to The Chase-Shawmut Company, Essex County, Mass., a corporation of Massachusetts Application October 21, 1953, Serial No. 387,447

14 Claims. (Cl. 200—120)

This invention relates to fuses, and more particularly to cool running high-interrupting-capacity low-voltage fuses.

Many high current-carrying-capacity low-voltage switches as, for instance, so-called entrance switches, are unable to withstand the electromagnetic and thermal effects of high short-circuit currents and must, therefore, be protected by fuses arranged in series with respect to the switches in the same electric circuit. The switch structures and the fuses provided for their protection are generally enclosed in common metal housings. On account of the high losses of the equipment accommodated in such housings the temperatures prevailing therein tend generally to be high, and it has become a major problem to keep the temperatures in such housings within tolerable limits. The heat losses occurring in conventional high-current-carrying-capacity high-interrupting-capacity fuses are frequently too high to permit their application within housings of high current-carrying-capacity low-voltage switches. In some instances fuses of a type predicated upon a sacrifice in interrupting capacity to achieve a limitation of heat losses are being applied for the purpose in hand. But even high-current-carrying-capacity fuses wherein interrupting ability has been sacrificed for a reduction of heat losses have so high heat losses as to cause serious trouble in many applications.

It is, therefore, one object of my invention to provide a high-current-carrying-capacity high-interrupting-capacity low-voltage fuse having much smaller heat losses than any comparable prior art device.

In some applications high-current-carrying-capacity low-voltage fuses are merely required to provide short-circuit current protection, but in many applications such fuses are required to provide both short-circuit protection and overload protection. In the coolest running prior art fuses of which I am aware the overload protective means are arranged outside of the fuse casing at the axially outer ends thereof, and the break or breaks for interrupting overload currents are produced in the open air.

It is another object of my invention to provide a fuse which runs as cool as the coolest running prior art fuses wherein, however, both the means for interrupting short-circuit currents and the means for interrupting overload currents are arranged in a common casing or enclosure in the same fashion as in prior art fuses of the type tending to run at relatively high temperatures.

The temperature of a fuse structure depends upon a number of factors among which the rate of heat generation and the rate of heat dissipation are prominent. Some prior art fuses include means tending to increase the rate of heat dissipation and thereby to limit the rise in temperature of the fuse structures during the normal operation or service thereof, i. e. while carrying load currents.

It is another object of this invention to limit the rise in temperature of fuse structures during the normal load carrying operation or service thereof by a drastic reduction of the rate of heat generation beyond any prior art precedents rather than by an increase of the rate of heat dissipation.

Another object of this invention is to provide a cool running fuse by miniaturization of the arc-initiating means forming an integral part of the fuse link. This miniaturization tends to greatly reduce the amount of electric energy required for arc-initiation on the occurrence of short-circuit currents as well as on the occurrence of overload currents, and tends also to minimize the amount of heat generated during the normal life of the fuse while it is carrying load currents.

A further object of the invention is to provide a current-limiting fuse having smaller watt losses per amp. carrying capacity than any prior art fuse of which I am aware.

Still another object of this invention is to provide a super-current fuse for circuit voltages less than 300 volts taking full advantage of the possibility of interrupting very high currents at this low voltage level by relatively simple means.

A further object of this invention is to provide electric low-voltage systems having high available short-circuit currents, which systems are fully protected against fault currents by fuses with extremely low watt losses per ampere current-carrying-capacity.

A further object of this invention is to provide a fuse capable of carrying currents in the order of several thousand amperes and of effecting faster interruption of electric circuits at 7 to 8 times the rated current than any comparable prior art fuse.

Other objects and advantages of the invention will, in part, be obvious and in part appear hereinafter.

For a fuller understanding of the nature and objects of the invention, reference should be had to the following detailed description and drawings, in which:

Fig. 1 is in part a vertical longitudinal sectional view and in part a front view of a fuse embodying my invention;

Fig. 2 is in part a section along 2—2 of Fig. 1 and in part a bottom plan view of the structure shown in Fig. 1;

Fig. 3 is a front view of a stamping to be used as fuse link;

Fig. 4 is a view of the structure of Fig. 3 and similar to Fig. 3 showing the parts of the stamping re-arranged for use in a fuse;

Fig. 5 is a section along 5—5 of Fig. 6 and shows on a larger scale the neck portion of a fuse link similar to the fuse links shown in Figs. 3 and 4;

Fig. 6 is a section along line 6—6 of Fig. 5;

Figure 16:
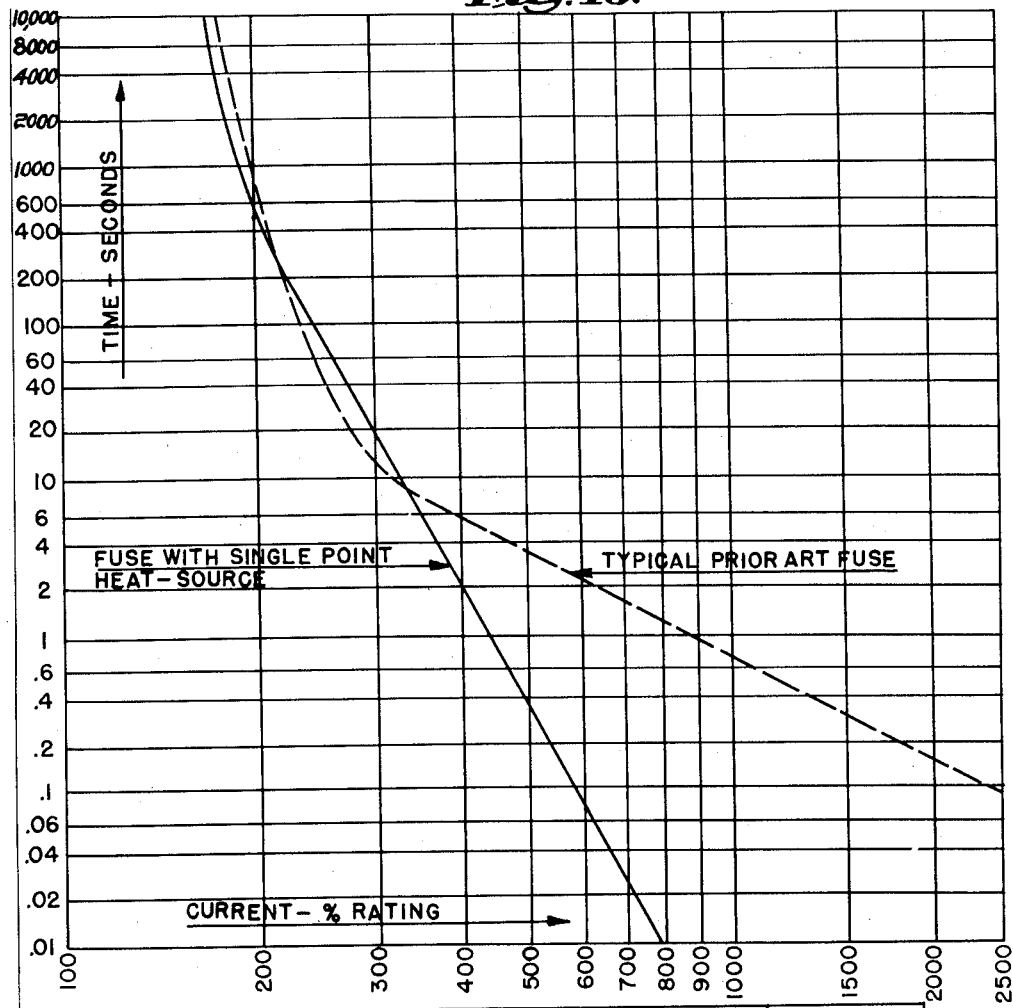
Figure 17:
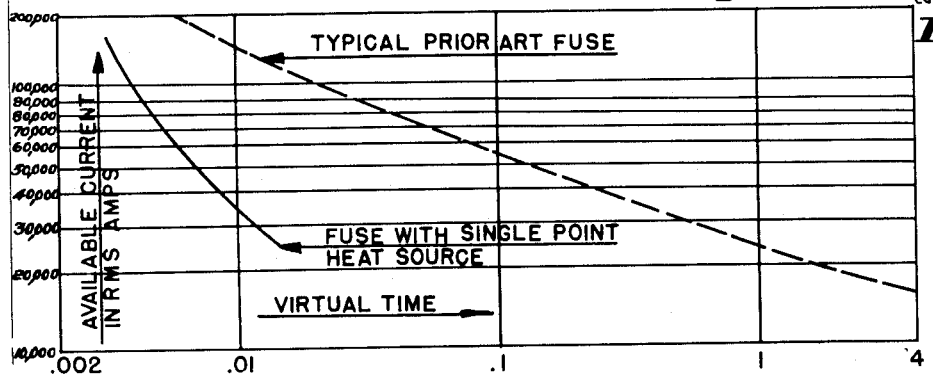

Figs. 9 to 13, inclusive, are front elevations of metal stampings illustrating the mode of operation of fuse links for fuses embodying the present invention;

Figs. 14 to 14b are oscillograms illustrating the mode of operation of fuses embodying the invention;

Fig. 15 shows diagrammatically an entrance switch and fuses accommodated in a common steel housing, and Figs. 16 to 17 are diagrams illustrating the mode of operation of fuses according to the present invention.

Figure 7:
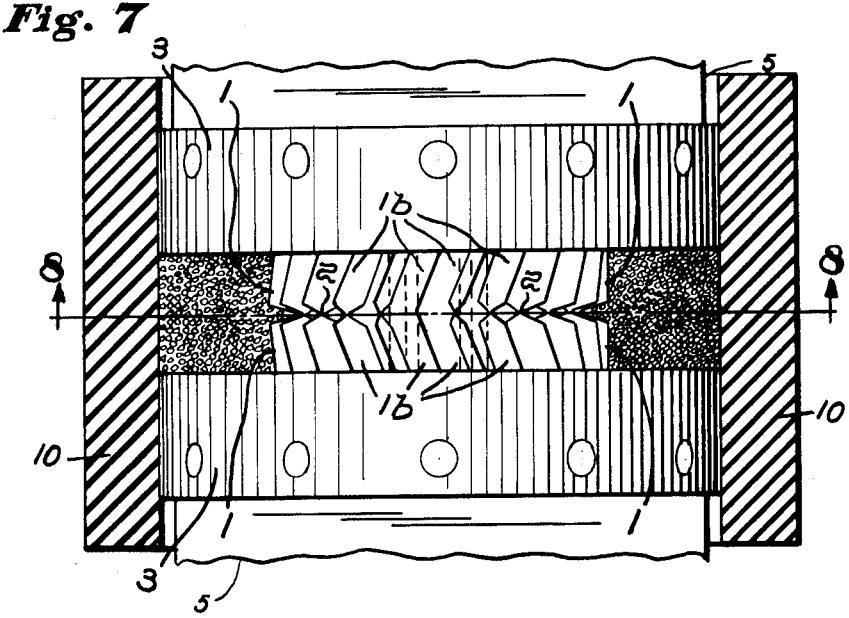
Fig. 7 is in part a front elevation of, and in part a longitudinal section through, a fuse structure embodying the invention.
Figure 8:
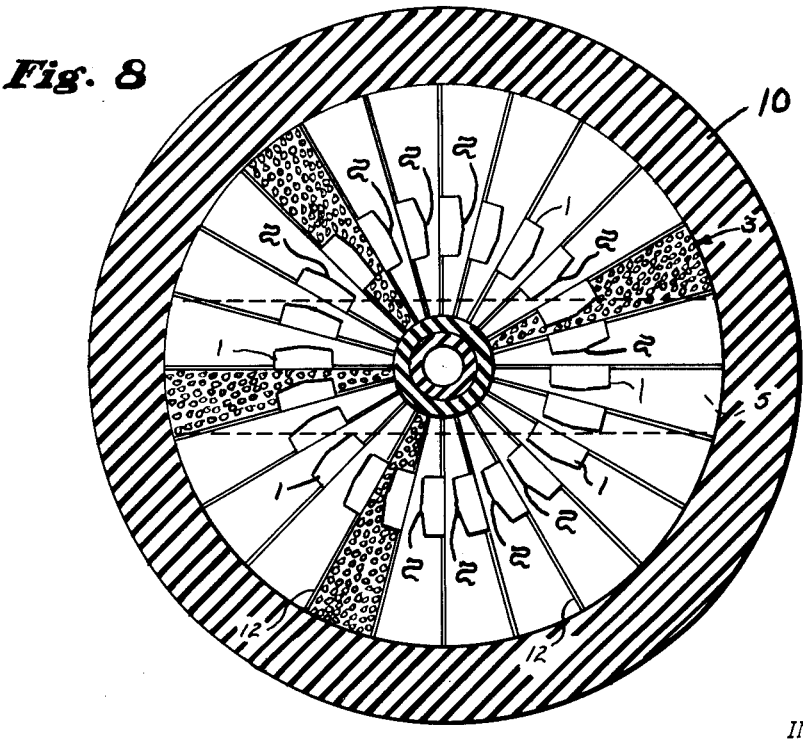
Fig. 8 is a cross-section along 8—8 of Fig. 7.

Referring now to Figs. 1, 2, 7 and 8, the fuse structure comprises a casing 10 made of an insulating material having a high degree of dimensional stability and being heat-shock resistant. I prefer to make the casing 10 of a glass-cloth synthetic resin laminate. The axially outer ends of casing 10 are closed by a pair of terminal plates or headers 3, each consisting of a heavy copper disc. Copper discs 3 are each provided at the axially inner faces thereof with a system of radially extending grooves 12 shown in Fig. 2 and more clearly illustrated in Fig. 8. Each of the grooves 12 encloses with the two grooves situated immediately adjacent thereto an acute angle of say α degrees. Each groove 12 in the upper disc 3 is arranged in registry with a like groove in the lower disc 3, and pairs of grooves in registry form a slide guide for insertion of one or more fuse links 1. According to Figs. 1 and 2 each pair of grooves 12 in registry accommodates two ribbon type fuse links 1. According to Figs. 7 and 8 one single fuse link 1 is inserted into each pair of grooves in registry, but sufficient space is left radially outwardly for the insertion of another fuse link which would approximately double the current-carrying-capacity of the fuse structure shown in Figs. 7 and 8. Each disc 3 is provided with a blade-type contact 5 projecting therefrom at right angles and forming an integral part thereof. Contacts 5 are provided with a plurality of holes 5a for insertion of a plurality of clamping screws intended to attach the fuse to a system of bus bars (not shown), or like electric conductors, capable of carrying heavy currents. Discs 3 are spaced by means of a pair of tubular concentric spacing elements 8, 9 of insulating material arranged in the center region of discs 3, and upon complete assembly of the fuse structure the casing 10 operates as an additional spacing element. A pair of caps of sheet metal, or ferrules, 4 may be arranged at the axially outer end of casing 10. These caps cover the radially outer ends of transverse steel pins 6 provided for establishing a mechanically firm connection between the headers or discs 3 and the casing 10. Only one such steel pin 6 is shown in Fig. 1. Fig. 7 shows a plurality of recesses in discs 3 for accommodating the steel pins without showing the steel pins as such. The inside of the casing 10 is filled with a pulverulent or granular arc-quenching material, preferably quartz sand of a relatively high degree of chemical purity from which iron has been carefully eliminated, if present therein. In Fig. 8 only some of the inter-link sectors have been shown as being filled with a pulverulent arc-quenching medium, but actually all these sectors are supposed to be filled in this fashion. The electric circuit into which the fuse is inserted has been indicated diagrammatically in Fig. 1 by two lines 13, 13.

Each fuse link 1 is provided with one single restricted cross-section portion or neck 2 having a cross-sectional area which is $\frac{1}{20}$, or less, of the cross-sectional area of the link where the latter is widest, i. e. where its width is uniform. Since the cross-sectional area of neck 1 is small, this tends to result in a relatively high neck resistance per unit of neck length, but since the length 1 of the neck (see Fig. 5) is very small, i. e. since the neck 2 is very short, this tends to limit the resistance of neck 2 to a relatively low value. If the length 1 of neck 2 were zero, this would make the resistance thereof infinitely small. A neck of very short length is an acceptable approximation to a neck of zero length and provides a current path of relatively low resistance in spite of the smallness of the cross-sectional area thereof. In other words, neck 2 is an approximation to a point heat source, as will be shown below more explicitly, and the $i^2 \cdot r$ losses occurring in neck 2 are correspondingly small. The heat losses occurring in the fuse are further minimized on account of the fact that but one single neck 2 is provided in each of the plurality of fuse links 1 arranged between the two headers or discs 3 and connected in parallel into the circuit including the conductors 13.

A fuse of the type shown in Figs. 1 and 2 wherein the current density in each neck 2 and other factors affecting the interrupting process are judiciously determined is capable of interrupting any circuit having a circuit voltage of less than 300 volts, irrespective of the magnitude of the available short-circuit current and the rate of rise thereof. This has been shown by many tests conducted with circuits having available short-circuit currents up to the order and in excess of 200 R. M. S. kilo amps.

Among the factors affecting the operation of the fuse particular attention should be given to the grain size of the arc-quenching quartz sand filler 7. The preponderant grain size should not be coarser than 50 U. S. sieve number; it may be 50 to 60 U. S. sieve number, or finer. Relatively fine pulverulent quartz fillers have relatively small air filled interstices between the constituent particles thereof and are, therefore, relatively poor thermal insulators, or relatively good thermal conductors. Fuses having arc extinguishing fillers of relatively small grain size have the ability of effectively interrupting high short-circuit currents but tend to have high $i^2 \cdot r$ losses because the effective dissipation of heat by fillers having a relatively small grain size calls for increased generation of heat. In fuses according to this invention fillers of relatively small grain size can be used without excessive $i^2 \cdot r$ losses because each link 1 has but one single neck 2 and because the neck 2 which is the arc initiating portion of the link is miniaturized and thus requires a minimum of heat to reach the temperature at which the interrupting process is initiated by a desintegration of the link and formation of an electric arc within the casing of the fuse.

Fig. 3 shows a ribbon preferably made of silver. This ribbon has a diamond-shaped perforation 14 in the center thereof. The ribbon may be of considerable length and comprise a plurality of diamond-shaped perforations 14. The dotted line 15 indicates the way in which the ribbon is severed by a stamping operation into a plurality of separate fuse links 1 each having a neck 2 of greatly restricted cross-sectional area defined by a pair of substantially V-shaped lateral notches 16. The neck 2 is situated substantially midway between the axially outer ends of each fuse link 1 and coincides with the hot spot of the fuse link. Each link 1 is provided with a tab-like projection 1a. The links 1 are inserted into the grooves 12 in such a way that their tab-like projections 1a are in abutting relation. This has clearly been shown in Fig. 4 but cannot be seen in Figs. 1 and 7 wherein tabs 1a are substantially hidden from sight by the sides of grooves 12.

Fuse links of the type shown in Figs. 3 and 4 are suitable for interrupting currents of major faults, or of short-circuit current proportions. Where it is also desired to effect interruption of overload currents of excessive duration, a metallic element is added to the links having a lower melting point than the metal of which links 1 are made and capable, upon reaching a predetermined temperature lower than the fusing point of the metal of which links 1 proper are made, to rapidly form an alloy with the metal of which links 1 are made. If the alloy is a relatively poor conductor of electricity, alloy-formation results in an appreciable acceleration of the heating process. In other words, formation of an alloy results in an increase of the $i^2 \cdot r$ losses at, and adjacent to, the point where the low melting point element is located and concomitant destruction of the fuse link.

According to Fig. 5 link 1 is provided with a rivet 11 of tin, indium or low fusing point indium-alloy, e. g. a tin-indium-alloy. The use of indium or indium-alloys is particularly advantageous as set forth in considerable detail in my copending patent application Ser. No. 374,033 filed August 13, 1953, for Fuses and Fuse Links of the Time Lag Type, now United States Patent 2,703,352, issued March 1, 1955. Rivet 11 is arranged immediately adjacent to neck 2 and thus directly heated by $i^2 \cdot r$ losses occurring in neck 2. Upon occurrence of an overload of inadmissible duration the metal of which rivet 11 consists fuses and flows toward the immediately adjacent edges of the V-shaped notches 16. This tends to cause the formation of two breaks at the two points indicated by the reference numeral 17. These two breaks tend to merge into one single break which causes interruption of the overloaded circuit. Since the mass of link metal situated at the points 17 between rivet 11 and V-shaped notches 16 is very small, the amount of low melting point metal required for forming an alloy having a relatively high resistivity at these two points is very small, and since the amount of low melting point metal is very small and that metal is situated immediately adjacent to neck or heat source 2, but a relatively small amount of heat is needed for causing fusion of rivet 11 and concomitant alloy-formation.

As long as the circuit into which the fuse is inserted is in a normal condition, the heat generated at the single quasi point heat source 2 of each link is readily dissipated. Owing to the small cross-sectional area of neck 2 and the small ratio between the cross-sectional area of the latter and that of the fuse link 1 at the points thereof where its cross-sectional area and width are largest, the temperature at the longitudinal edges of the fuse links 1 generally hardly exceeds ambient temperature while the fuse is carrying its rated current. On the occurrence of fault currents of large magnitude the fusion and vaporization temperature of necks 2 is reached very rapidly, i. e. before any appreciable heat exchange can take place between the necks 2 and the adjacent portions of link 1. Thus the process of interruption is initiated before the short-circuit current can reach the available peak value thereof. On the occurrence of overloads the heat exchange between the neck portions 2 of links 1 and the wide cross-section portions thereof results in a delayed fusion of rivets 11, thus imparting the desired time lag inverse time-current characteristic to the fuse structure.

The two aforementioned breaks formed on overloads of inadmissible duration rapidly merge into one single break and the next rapidly following step in the process of interruption of overloads is growth of that break, including rapid vaporization of the miniaturized neck 2. Vaporization of neck 2 results in a substantial increase of the arc voltage soon followed by complete arc extinction.

On the occurrence of major faults the arcs initiated by fusion and vaporization of necks 2 grow in axial and transverse direction and burn back to the area where rivet 11 is located. Thus substantially the same portions of the links 1 are vaporized, both on overload and major fault current interruptions.

According to the teachings of the prior art the points on fuse links where interruption is effected on major fault currents and the points on fuse links where interruption is effected on protracted overloads by an alloying process should be spaced relatively far apart to preclude arcs developed on major faults to burn back into the low melting point alloy-forming metal and thus become contaminated by the vapors thereof which tend to prolong arcing and make circuit interruption more onerous. In the fuse structure shown the violation of the teachings of the prior art has no noticeable adverse results because of the miniaturization of the mass of low melting point alloy-forming metal applied to each link, i. e. because the amount of that metal is kept sufficiently small to preclude a serious contamination of the arc formed within the fuse.

The dimensions of necks 2 may be kept sufficiently small to simulate point heat sources to such an extent that the heat losses in the fuse are less than .05 watt per amp. at rated current. By a judicious selection of various parameters, the choice of indium or a low fusing point alloy of indium for making rivets 11, adoption of a flexible link arrangement of the type best shown in Figs. 7 and 8 and concomitant further decrease of the dimensions of necks 2 to the limit set by mechanical strength requirements and adopted manufacturing methods, the watt losses per amp. at rated current can be further reduced to .025 watt per amp. at rated current, and even less. While watt losses depend upon a number of parameters and may vary depending upon how these parameters are changed or modified, the one parameter by far most critically affecting watt losses is how close the dimensions of necks 2 simulate a point heat source.

As appears from the foregoing, the extent to which a point heat source may be simulated depends preponderantly upon mechanical strength requirements. If links 1 are formed by flat silver or copper ribbons, i. e. ribbons extending in but one single plane, the tendency of fracture of links 1 at their miniaturized necks 2 is relatively great. In such an arrangement the risk of fracture must either be accepted, or some of the advantages possible from extreme neck miniaturization must be sacrificed to strength requirements. The assembly best shown in Figs. 7 and 8 permits extreme miniaturization of the necks 2 without appreciable danger of link fracture.

According to Figs. 7 and 8 the metal discs 3 are provided at their axially outer surfaces with blade contacts 5, whereas their axially inner surfaces are covered with systems of radially extending link-receiving grooves 12. Each groove 12 is angularly displaced from the adjacent groove and all angles of displacement are equal. The fuse links 1 are arranged in a circular pattern with the narrow transversal edges thereof inserted into grooves 12 and connected to discs 3 by appropriate solder joints (not shown). The axially outer portions 1b of fuse links 1 situated on opposite sides of necks 2 enclose angles, i. e. each link is substantially in the shape of an arrow-head, the necks 2 corresponding to the point of the arrow-head. The angles enclosed by each pair of fuse link portions 1b are equal and all fuse links 1 are identical. The bend, or kink, in each fuse link 1 greatly increases the flexibility of the structure and greatly reduces the danger of fracture of the links 1 at the neck portions 2 thereof, thus permitting to simulate relatively closely a point heat source by the necks 2.

The bend, or kink, in the links 1 is also significant because it provides a current loop establishing a magnetic blow-out field which has the tendency of propelling the arc formed at the neck region away from the neck region in the direction in which the current path loops or, in other words, in the direction in which the two portions 1b of each link 1 point. The effect of the magnetic blow-out field can readily be noticed from the geometrical configuration of the fulgurites formed by fusion of the quartz sand filler adjacent the fuse links under the heat of the arcs formed within the fuse. The rapid generation of heat by short-circuit currents having a rapid rate of rise results in an explosion-like dissipation of the neck portions 2 of links 1. Because of the electromagnetic action of the loop-shaped current path provided by each link, the amount of arc products expelled from the necks 2 in the direction in which the portions 1b of each link 1 point, exceeds by far the amount of arc products which is expelled in the opposite direction. The magnetic bias upon the arcs within the fuse tending to move the arcs away from the points of arc initiation towards areas which are relatively cooler tends to impart fuses according to this invention with additional interrupting ability not present in other types of fuses wherein the arcs are not subjected to a magnetic bias as favorable as in the structure of Figs. 7 and 8.

Referring now to Figs. 9 to 11, Fig. 9 shows a piece of thin sheet metal 20 having a point heat source 21 in the center thereof. Such a heat source is of a hypothetical nature and can only be approximated to some extent by any engineered product. A system of circular isothermic curves 22 is formed around point heat source 21, the thermal gradient in radially outer direction being quite steep. At a predetermined distance from the point heat source 21 the temperature at the surface of the metal sheet 20 is equal to ambient temperature.

Fig. 10 shows a piece of sheet metal 23 generally similar to that shown in Fig. 9, except that the piece of sheet metal 23 is provided with a pair of fine lateral incisions or slits 24 which leave between them an extremely short neck 25 having a very small width and hence a very small cross-sectional area. If an electric current is caused to flow through the piece of sheet metal 23, the lines of flow will be very crowded at the short narrow neck 25. Consequently $i^2 \cdot r$ losses will be concentrated at the neck 25, i. e. neck 25 will simulate a point heat source. No lines of flow appear in the region of the open ends of lateral incisions or slits 24. A certain amount of metal may be cut off at this region without affecting the current distribution. Though the V-shaped notches to both sides of neck 25 have no effect upon current distribution within the link, they have an effect upon temperature distribution and heat dissipation. They reduce the heat flow away from neck 25, and by so doing reduce the $i^2 \cdot r$ losses required for maintaining neck 25 at a predetermined temperature. If the angle $\gamma$ indicated in Fig. 11 is too large, i. e. exceeds a predetermined range, the current distribution in the metal stamping shown in this figure begins to deviate more or less markedly from the behavior of the metal stamping shown in Fig. 10.

The vaporization pattern of a fuse link of the type shown in Figs. 3 to 6, inclusive and in Fig. 11, having one single miniaturized neck between the axially outer ends thereof differs from the vaporization pattern of conventional fuse links. The difference in vaporization pattern has been shown diagrammatically in Figs. 12 and 13.

Fig. 12 shows one neck of a fuse link which may be of the single neck or plural neck type. The neck is relatively long and the ratio of neck width $a$ to link width $b$ is relatively large. The geometry of the link stamping shown in Fig. 13 differs from that shown in Fig. 12 in that the former has a neck of considerably smaller length and in that the ratio of neck width $a$ to link width $b$ is relatively small, e. g. 1:30.

If an arc is initiated at the neck of a link of the type shown in Fig. 12, arcing results in relatively rapid gap growth and concomitant arc elongation and increase of the arc voltage. In the case of a link of the type shown in Fig. 13 the arc gap growth occurs significantly in transverse rather than in axial direction. This has been shown by a family of lines 30 which indicate the configuration of the link at different times $t_1, t_2, t_3 \ldots$ during the arcing period. Because the gap growth in axial direction is relatively slow, the arc voltage may tend to increase relatively slowly, yet this tendency is more or less offset by the large area of interaction between the arc and the surrounding pulverulent arc-quenching medium.

Figs. 14, 14a and 14b give an idea of how the action of the various design features which have been disclosed above combine to limit and interrupt a short-circuit current. These figures refer to a test conducted on a fuse of the type shown in Figs. 1, 2, 7 and 8 having a current rating of 1600 amps. at 250 volts A. C. The available short-circuit current was 110,000 R. M. S. amps. or 180,000 peak amps. The melting time was .00155 second, the arcing time .00577 second and the total interrupting time .00732 second. The current continued to rise after melting of the fuse links and reached a peak of 68,900 amps. rather than the available peak of 180,000 amps. The rise of the current after melting of the fuse links was considerably smaller than the natural sinusoidal rise thereof. The point of time at which the rate of rise of the current became zero coincides with the peak of the arc voltage.

The table below comprises data obtained from tests conducted with fuses of the type shown in Figs. 7 and 8 having different current ratings.

| R | $V_E$ | $V_E - V_B$ | I | | Ω |
|---|---|---|---|---|---|
| 1,200 | 17 | 24 | 1,020 | 160 | $10^{-7}$ |
| 1,600 | 12 | 16 | 1,020 | 116 | $10^{-7}$ |
| 2,000 | 21 | 27 | 2,000 | 105 | $10^{-7}$ |
| 2,500 | 18 | 22 | 2,540 | 726 | $10^{-8}$ |
| 4,000 | 19 | 23 | 3,870 | 490 | $10^{-8}$ |
| 5,000 | 16.5 | 20.5 | 3,900 | 423 | $10^{-8}$ |

In the above table R signifies the current rating in amps., $E_E$ the voltage drop across the fuse links in millivolts, $V_E - V_B$ the voltage drop across the entire fuse including the voltage drop across the fuse links and across the blade contacts in millivolts, I the continuous current in amps. at which the respective test was made and Ω the resistance of the fuse link in ohms.

The table below refers to a heat run made with a fuse according to this invention having a current rating of 5000 amps. at a circuit voltage of 250 volts.

| I | t | $t_a$ |
|---|---|---|
| 3,400 | 55 | 23 |
| 4,000 | 62 | 23 |
| 4,500 | 65 | 24 |
| 5,000 | 67 | 23 |

In the above table I is the current in amps. flowing through the fuse, $t$ is the stationary temperature in deg. C. prevailing on the surface of the middle portion of the casing measured by a thermocouple after several hours of operation, and $t_a$ is the ambient temperature in deg. C.

The fuses were rated in terms of flotation current and wherever the term rated current has been used above this means ⅔ of the flotation current. The flotation current of a fuse corresponds to the asymptote of the time-current characteristic of the fuse. While this is the theoretical definition of the term flotation current, flotation current may also be defined for practical purposes as the critical current at which practically identical fuses may or may not blow upon a long time of operation (depending upon small unavoidable manufacturing tolerances).

While it would theoretically be possible to manufacture fuse links having a true point heat source and no heat losses whatsoever, assuming a fuse structure comprising a plurality of fuse links adapted to be connected in parallel into an electric circuit, each link having but one single zone of restricted cross-sectional area or neck, and further assuming that the links are stamped from ribbon sheet metal stock by conventional manufacturing methods and that their necks are about just as strong as reasonable minimum mechanical strength requirements dictate, this yields simulated point heat sources sufficiently close to true point heat sources to limit heat losses to the stated order of watts per amp. at rated current. This order is far less than any comparable data which I have been able to find in the published literature on fusible protective devices, or which I have been able to determine by tests made with various makes of high capacity fuses which were purchased in the market.

It will be noted that the stated data of watt losses per amp. refer to load currents equal to the rated current of the fuse. The watt losses per amp. are different from the stated data if the fuse is caused to carry currents of a higher order. Watt losses depend also upon the number of identical links enclosed in a common casing and tend to increase as the current rating of the fuse is increased.

Referring now to Fig. 15, reference numeral 50 has been applied to indicate a common enclosure of metal for three fuses 51 and a multipolar load break switch 52 serially arranged in the circuit R, S, T. The common enclosure of cubicle 50 is preferably made of sheet metal and may also house a number of bus bars, as is common practice. The fuses 51 are of the same type as the fuse shown in Figs. 1, 2, 7 and 8. The following table indicates data obtained from a heat run made with fuses of this type having a rated current of 4,000 amps. and housed with a load-break-switch in a common metal housing or cubicle.

| | Cubicle | | | |
|---|---|---|---|---|
| | Non-Ventilated | | Ventilated | |
| Location of Thermocouple | Total Temperature, ° C. | Temperature above Room Ambient, ° C. | Total Temperature, ° C. | Temperature above Room Ambient, ° C. |
| Top Terminal of Fuse | 87 | 63 | 84 | 61 |
| Center of Fuse Casing | 75 | 51 | 65 | 42 |

The type of fuse shown in Figs. 1, 2, 7 and 8 has a substantial time lag in the low overload range in spite of the miniaturization of the low fusing point overlay on each link and effects rapid interruption of major fault currents in spite of the fact that the low fusing point overlay is being vaporized irrespective of whether the fault current is of small or of high magnitude. The following table indicates a time-current characteristic which has been obtained with a fuse of the type under consideration:

150% rated current, opening time 55 min.
200% rated current, opening time 8 min.
300% rated current, opening time 18 sec.
400% rated current, opening time 2.0 sec.
500% rated current, opening time .35 sec.
700% rated current, opening time .025 sec.

Figs. 16 and 17 enable a comparison between the operating characteristic of fuses according to the present invention and two of the fastest prior art current-limiting fuses which are available in the United States of America, and Fig. 17 enables a comparison between the operating characteristics of fuses according to the present invention and fuses of the type disclosed in United States Patent 2,592,399 to W. S. Edsall et al., April 8, 1952, Current-Limiting Fuse and in United States Patent 2,647,970 to W. S. Edsall et al., April 4, 1953, Current-Limiting Fusible Protective Device.

Referring now to Fig. 16, wherein both the abscissae and the ordinates have been drawn on logarithmic scales, and wherein time in seconds has been plotted against current in percent of fuse rating, the curve marked "Typical Prior Art Fuse" refers to a fillerless fuse of the type generally known as current-limiter and the curve marked "Fuse With Single Point Heat Source" refers to a fuse of the type shown in Figs. 1, 2, 7 and 8. The two characteristics do not differ significantly up to currents in the order of 400% of the rated current (the term rated current is being used in this context as previously defined). At overcurrents in the order of 700–800% of the rated current the typical prior art fuse blows within a time exceeding 1 second, whereas the "Fuse With Single Point Heat Source" blows within a time in the order of hundredth of a second, i. e. about 100 times faster. It may safely be assumed that there is some serious fault in an electric system if the current flowing therein is as high as 700 to 800% the rated current, and if there is a serious fault in an electric system the fault should be cleared as fast as possible. The prior art fuse shown in Fig. 16 has a very substantial time lag in the range of 700 to 800% the rated current and is, therefore, less desirable than the "Fuse With Single Point Heat Source".

In Fig. 17 both the abcissae and the ordinates have been drawn on logarithmic scales and the available current in R. M. S. amps. has been plotted against virtual time in seconds. In the fuse art the term virtual time is used to refer to the time that the available current must flow to generate the same amount of heat in the circuit as that produced by the fault current while the fuse is blowing. The curve marked "Typical Prior Art Fuse" refers to a prior art high interrupting-capacity fuse with quartz filler and a plurality of fuse links of silver arranged in parallel in the protected circuit. The curve marked "Fuse With Point Heat Source" refers to a fuse of the type shown in Figs. 1, 2, 7 and 8. Both fuses to which Fig. 17 refers had a current-rating of 3000 amps. Hence 7 times their current rating is 21,000 amps. and 8 times their current rating is 24,000 amps. At available currents in the order of 7 to 8 times the rated current the virtual time of the "Typical Prior Art Fuse" is in the order of 1 second, whereas the virtual time of the "Fuse With Single Point Heat Source" is in the order of hundredth of a second. The first mentioned fuse has virtual times of .14 second and .019 second, respectively, if the available current is 50,000 amps. and 110,000 amps., respectively, whereas the last mentioned fuse has virtual times of .00681 second and .00352 second if the available current is 50,000 amps. and 110,000 amps., respectively.

Figure 18:
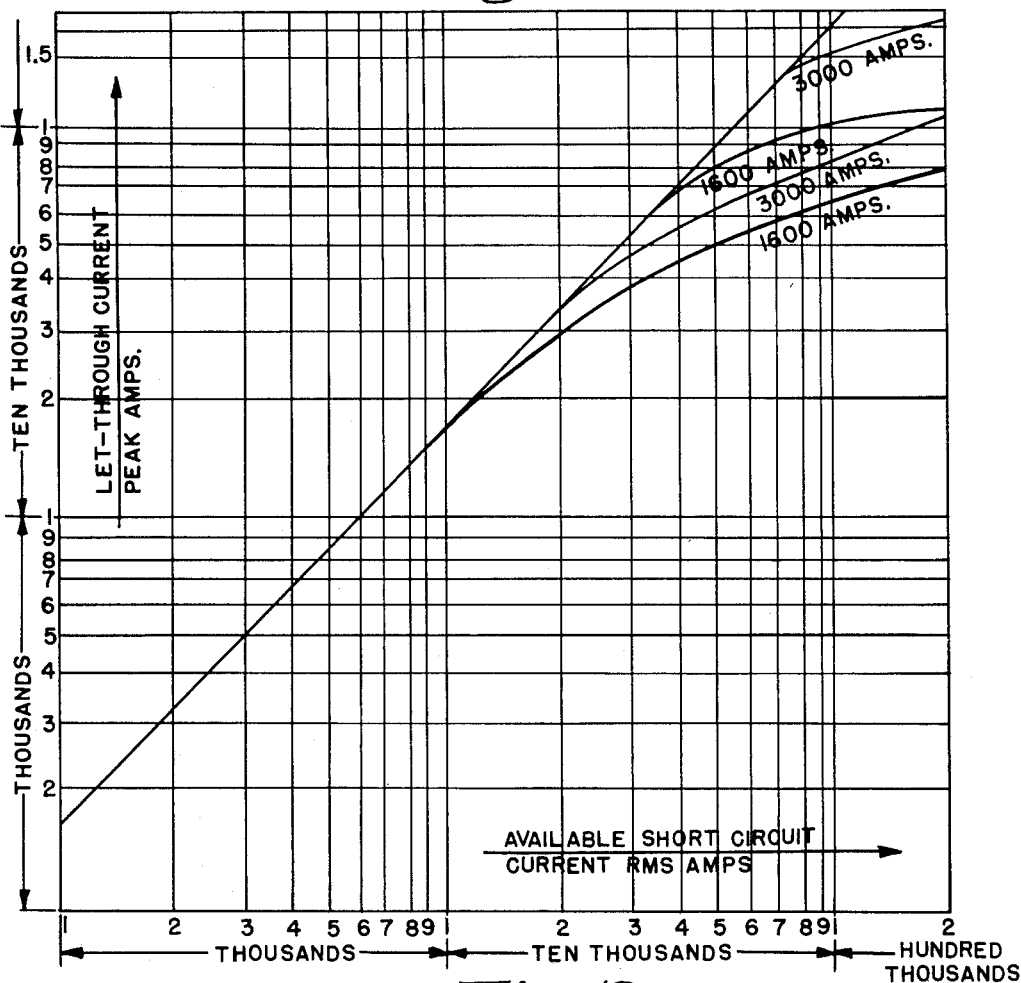

In Fig. 18 both the abscissae and the ordinates have been drawn on logarithmic scales and the let-through current in peak amps. has been plotted against the available short-circuit current in R. M. S. amps. The two upper curves marked 3000 amps. and 1600 amps., respectively, refer to two fuses having that current rating and built according to the above referred-to United States patents to W. S. Edsall et al. The two lower curves marked 3000 amps. and 1600 amps., respectively, refer to fuses of the type shown in Figs. 1, 2, 7 and 8 and having the given current-rating. Fig. 18 indicates that fuses according to Figs. 1, 2, 7 and 8 have considerably smaller let-through currents than fuses of the type disclosed in the above referred-to United States patents to W. S. Edsall et al.

Figure 19:
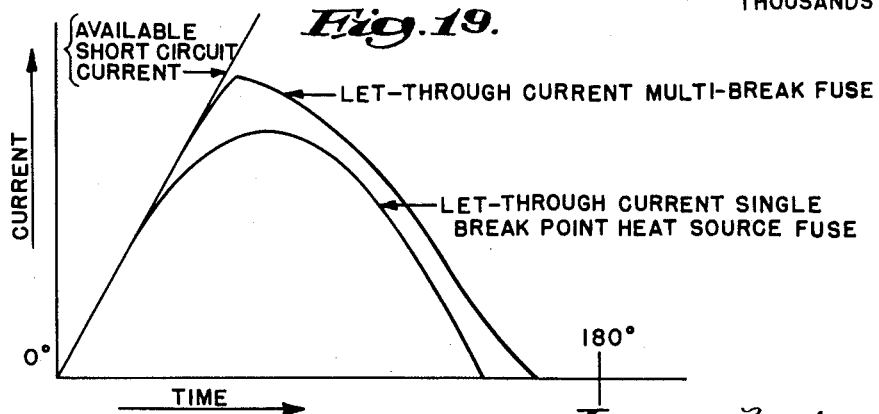

In Fig. 19 current has been plotted against time in terms of electrical degrees and both the abscissae and the ordinates have been drawn on linear scales. The line marked "Available Short-Circuit Current" is indicative of the initial rate of rise of a short-circuit current and has been drawn on the assumption that the current rises linearly with time. The curve marked "Let-Through Current Multi-Break Fuse" indicates the let-through current of a fuse of the type shown in the two above United States patents to W. S. Edsall et al. The curve marked "Let-through Current Single Break Point Heat Source Fuse" indicates the let-through current of a fuse of the type shown in Figs. 1, 2, 7 and 8. It is apparent that the let-through current continues to rise in the last mentioned type of fuses after the time of fusion of the fuse links and initiation of the interrupting process, whereas in fuses of the type disclosed in the above referred to United States patents to W. S. Edsall et al. the let-through current reaches its peak at the instant of link fusion and arc initiation and begins to decay instantly thereafter. The instant current decay in this type of fuses is due to the fact that they are conducive to high arc voltages which voltages are relatively high as soon as the arc is being initiated. Fuses of the type shown in Figs. 1, 2, 7 and 8 have initially a relatively small arc voltage and this permits the current to rise—though at a greatly reduced rate—even after an arc has been kindled within the fuse. It is apparent from Fig. 19 that the fuses according to this invention cause arc initiation at an earlier point of time than the prior art multibreak fuses, that the fuses according to this invention have a lower let-through peak than the prior art multibreak fuses, and that the area under the curve marked "Let-Through Current Single Break Point Heat Source Fuse" is considerably smaller than the area under the curve marked "Let-through Current Of Multi-Break." For these reasons the fuses according to the present invention are more desirable in circuits whose circuit voltage is less than 300 volts than the reference fuse according to the above United States patents to W. S. Edsall et al.

It will be apparent from the foregoing that the fact that the fuses according to this invention blow in times in the order of hundredth of a second when subjected to overcurrents in the order of 7 to 8 times the rated current of the fuse is primarily due to the degree of approximation of true point heat sources by the neck portions of the fuse links.

It will be understood that, although but a few embodiments of this invention have been shown and described in detail, the invention is not limited thereto and that the illustrated embodiments may be modified or other embodiments made without departing from the spirit and scope of the invention as set forth in the accompanying claims.

It is claimed:

1. In combination an electric circuit having a circuit voltage of less than 300 volts and a predetermined available short-circuit current, and a current-limiting fuse inserted into said circuit to limit the flow of current therein below said available short-circuit current, said fuse comprising casing means, pulverulent filler means within said casing means, and a plurality of ribbon type fuse links arranged in parallel relation in said circuit and embedded in said filler means, each of said plurality of fuse links having one single neck portion spaced substantially equidistantly apart from the axially outer ends thereof and formed by a pair of lateral substantially V-shaped incisions, the dimensions of said neck portion of each of said plurality of links being sufficiently close to a point heat source to limit the heat losses in said fuse to less than .05 watt per amp. at rated current.

2. In combination an electric circuit having a circuit voltage of less than 300 volts and a predetermined available short-circuit current, and a current-limiting fuse inserted into said circuit to limit the flow of currents therein below said available short-circuit current, said fuse comprising a casing of glass-cloth reinforced plastic, a pulverulent quartz filler within said casing and a plurality of ribbon type fuse links of silver arranged in parallel relation in said circuit and embedded in said filler, each of said plurality of fuse links having a pair of substantially V-shaped lateral notches defining one single neck portion situated substantially midway between the axially outer ends of each of said plurality of fuse links, the dimensions of said neck portion being sufficiently close to a point heat source to limit the heat losses in said fuse to less than .05 watt per amp. at rated current.

3. In combination an electric circuit having a circuit voltage of less than 300 volts and a predetermined available short-circuit current, and a current-limiting fuse inserted into said circuit to limit the flow of current therein below said available short-circuit current, said fuse comprising a casing, a pulverulent quartz filler within said casing and a plurality of ribbon type fuse links of silver arranged in parallel relation in said circuit and submerged in said filler, each of said plurality of fuse links being provided with one single point of restricted cross-sectional area formed by a pair of lateral substantially V-shaped incisions, said point of restricted cross-sectional area being less than $\frac{1}{20}$ of the cross-sectional area of each of said plurality of fuse links, and situated substantially midway between the axially outer ends of each of said plurality of fuse links, and the length and the cross-sectional area of said point of restricted cross-sectional area being sufficiently close to zero to form a virtual point heat source limiting the heat losses in said fuse to the order of .025 watt per amp. at rated current.

4. In combination an electric circuit having a circuit voltage of less than 300 volts and a predetermined available short-circuit current, a switching device adapted to carry continually currents in excess of 1000 amps. arranged in said circuit, a housing accommodating said switching device, and a current-limiting fuse arranged in said circuit in series with said switching device and accommodated in said housing, said fuse comprising a casing, a pulverulent quartz filler within said casing and a plurality of ribbon-type fuse links arranged in parallel relation in said circuit and embedded in said filler, each of said plurality of fuse links being provided with one single point of restricted cross-sectional area formed by a pair of lateral substantially V-shaped incisions, said point of restricted cross-sectional area being less than $\frac{1}{20}$ of the cross-sectional area of each of said plurality of fuse links and situated substantially midway between the axially outer ends of each of said plurality of fuse links and the length and the cross-sectional area of said point of restricted cross-sectional area being sufficiently close to a point heat source to limit heat losses in said fuse to less than .05 watt per amp. at rated current.

5. In combination an electric circuit having a circuit voltage of less than 300 volts and a predetermined available short-circuit current, and a current-limiting fuse inserted into said circuit to limit the flow of current therein below said available short-circuit current, said fuse comprising casing means, pulverulent filler means within said casing means, and a plurality of ribbon type fuse links arranged in parallel relation in said circuit and embedded in said filler means, each of said plurality of fuse links having one single neck portion spaced substantially equidistantly apart from the axially outer ends thereof, the dimensions of said neck portion of each of said plurality of fuse links being sufficiently close to a point heat source to limit the heat losses in said fuse to less than .05 watt per amp. at rated current, and a mass of a metal having a lower melting point than the metal of which said plurality of fuse links is made secured to each of said plurality of fuse links at a point thereof immediately adjacent said neck to form an alloy with the metal of which said plurality of fuse links is made at temperatures below the melting point of the metal of which said plurality of fuse links is made, the quantity of said mass being confined to the order required to cause desintegration upon occurrence of inadmissible overloads of each of said plurality of fuse links immediately adjacent said neck portion thereof.

6. In combination an electric circuit having a circuit voltage of less than 300 volts and a predetermined available short-circuit current, and a current-limiting fuse inserted into said circuit to limit the flow of current therein below said available short-circuit current, said fuse comprising casing means, pulverulent filler means within said casing means, and a plurality of ribbon-type fuse links arranged in parallel in said circuit and embedded in said filler means, each of said plurality of fuse links having one single neck portion situated substantially midway between the axially outer ends thereof and defined by a pair of substantially V-shaped lateral notches, the dimensions of said neck portion being sufficiently close to a point heat source to limit the heat losses in said fuse to less than .05 watt per amp. at rated current, and a relatively small mass of a low melting point alloy-forming metal including indium secured to each of said plurality of fuse links at a point thereof immediately adjacent to said pair of notches tending to cause formation of a pair of breaks upon occurrence of inadmissible overloads between the point where said mass is located and a pair of edges of said notches.

7. A current-limiting fuse comprising casing means, a pulverulent quartz filler within said casing means, and a plurality of ribbon-type fuse links embedded in said filler, each of said plurality of fuse links having one single neck portion situated substantially in the middle between the axially outer ends thereof and defined by a pair of substantially V-shaped lateral notches, the dimensions of said neck portion being sufficiently close to a point heat source to limit the heat losses in said fuse to less than .05 watt per amp. at rated current, and a relatively small mass of a low melting point alloy-forming metal secured to each of said plurality of fuse links at a point thereof immediately adjacent to said pair of notches tending to cause formation of a pair of breaks upon occurrence of inadmissible overloads between the point where said mass is located and a pair of edges of said notches.

8. In combination an electric circuit having a circuit voltage of less than 300 volts and a predetermined available short-circuit current, and a current-limiting fuse inserted into said circuit to limit the flow of current therein below said available short-circuit current, said fuse comprising a casing, a pulverulent quartz filler having a preponderant grain size finer than U. S. sieve number 50 within said casing, and a plurality of ribbon-type fuse links inserted in parallel relation into said circuit, submersed in said filler, arranged in radial planes within said casing, each of said plurality of fuse links being provided with one single point of restricted cross-sectional area less than $\frac{1}{20}$ of the cross-sectional area of each of said plurality of fuse links, said point of restricted cross-sectional area being situated substantially in the center between the axially outer ends of each of said plurality of fuse links and being defined by a pair of substantially V-shaped lateral notches, the dimensions of said point of restricted cross-sectional area being sufficiently close to a point heat source to limit the heat losses in said fuse to less than .05 watt per amp. at rated current, and a relatively small mass of low melting point alloy-forming metal secured to each of said plurality of fuse links immediately adjacent to said pair of notches tending to cause formation of a pair of breaks upon occurrence of inadmissible overloads between the point where said mass is located and a pair of edges of said pair of notches.

9. A fuse comprising a casing, a pulverulent arc-quenching filler within said casing, a plurality of ribbon-type fuse links arranged in a circular pattern within said casing and submersed in said filler, each of said plurality of fuse links having a point of restricted cross-sectional area situated between the axially outer ends thereof, the portions of each of said plurality of fuse links situated on opposite sides of said point of restricted cross-sectional area enclosing an angle and the angles enclosed by said portions of each of said plurality of fuse links being equal.

10. A current-limiting fuse comprising a casing, a pulverulent arc-quenching filler within said casing, a plurality of ribbon-type fuse links accommodated within said casing, each of said plurality of fuse links having one single neck portion situated substantially in the middle between the axially outer ends thereof, the dimensions of said neck portion being sufficiently close to a point heat source to limit the heat losses in said fuse to less than .05 watt per amp. rated current, said plurality of fuse links being arranged in a circular pattern with the narrow transverse edges thereof situated in a plurality of radially extending angularly displaced planes, and the portions of each of said plurality of fuse links on opposite sides of said neck thereof enclosing an angle, and the angles enclosed by said portions of each of said plurality of fuse links being equal.

11. In combination an electric circuit having a circuit voltage of less than 300 volts and a predetermined available short-circuit current, and a current-limiting fuse arranged in said circuit to limit the flow of current therein below said available short-circuit current, said fuse comprising a casing, a pulverulent arc-quenching filler within said casing, and a plurality of ribbon-type fuse links arranged in a circular pattern within said casing with the narrow transversal edges thereof situated in a plurality of radially extending angularly displaced planes, each of said plurality of fuse links being provided with a single point of restricted cross-sectional area less than 1/20 of the cross-sectional area of each of said plurality of fuse links, said point of restricted cross-sectional area being spaced substantially equally from the axially outer ends of each of said plurality of fuse links and the length and the cross-sectional area of said point of restricted cross-sectional area being sufficiently close to a point heat source to limit the heat losses in said fuse to the order of .025 watt per amp. at rated current, the axially outer portions of each of said plurality of fuse links situated on opposite sides of said point of restricted cross-sectional area enclosing an angle and the angle enclosed by said portions of each of said plurality of fuse links being equal.

12. In combination an electric circuit having a circuit voltage of less than 300 volts and a predetermined available short-circuit current, and a current-limiting fuse inserted into said circuit to limit the flow of current therein below said available short-circuit current, said fuse comprising casing means, pulverulent filler means within said casing means, and a plurality of ribbon type fuse links arranged in parallel relation in said circuit and embedded in said filler means, each of said plurality of fuse links having one single neck portion spaced substantially equidistantly apart from the axially outer ends thereof and formed by a pair of laterally substantially U-shaped notches, the dimensions of said neck portion of each of said plurality of fuse links being sufficiently close to a point heat source to cause blowing of said fuse within a time in the order of hundredth of a second on overcurrents in the order of 7 to 8 times the rated current of said fuse.

13. In combination an electric circuit having a circuit voltage of less than 300 volts and a predetermined available short-circuit current, and a current-limiting fuse inserted into said circuit to limit the flow of currents therein below said available short-circuit current, said fuse comprising a casing of glass-cloth reinforced plastic, a pulverulent quartz filler within said casing and a plurality of ribbon type fuse links of silver arranged in parallel relation in said circuit and embedded in said filler, each of said plurality of fuse links having a pair of substantially V-shaped lateral notches defining one single neck portion situated substantially midway between the axially outer ends of each of said plurality of fuse links, the dimensions of said neck portion being sufficiently close to a point heat source to cause blowing of said fuse within a time in the order of hundredths of a second on overloads 7 to 8 times the rated current of said fuse.

14. In combination an electric circuit having a circuit voltage of less than 300 volts and a predetermined available short-circuit current, and a current-limiting fuse inserted into said circuit to limit the flow of current therein below said available short-circuit current, said fuse comprising a casing, a pulverulent quartz filler within said casing and a plurality of ribbon type fuse links of silver arranged in parallel relation in said circuit and submersed in said filler, each of said plurality of fuse links being provided with one single neck of restricted cross-sectional area less than 1/20 of the cross-sectional area of each of said plurality of fuse links at the point of widest cross-sectional area thereof, said neck being formed by a pair of lateral substantially U-shaped incisions situated substantially midway between the axially outer ends of each of said plurality of fuse links, and the length and the cross-sectional area of said neck being sufficiently close to zero to form a virtual point heat source causing blowing of said fuse within a time in the order of hundredths of a second on overloads 7 to 8 times the rated current of the fuse.

References Cited in the file of this patent

UNITED STATES PATENTS 2,665,348     Kozacka               Jan. 5, 1954